Patented Sept. 20, 1932

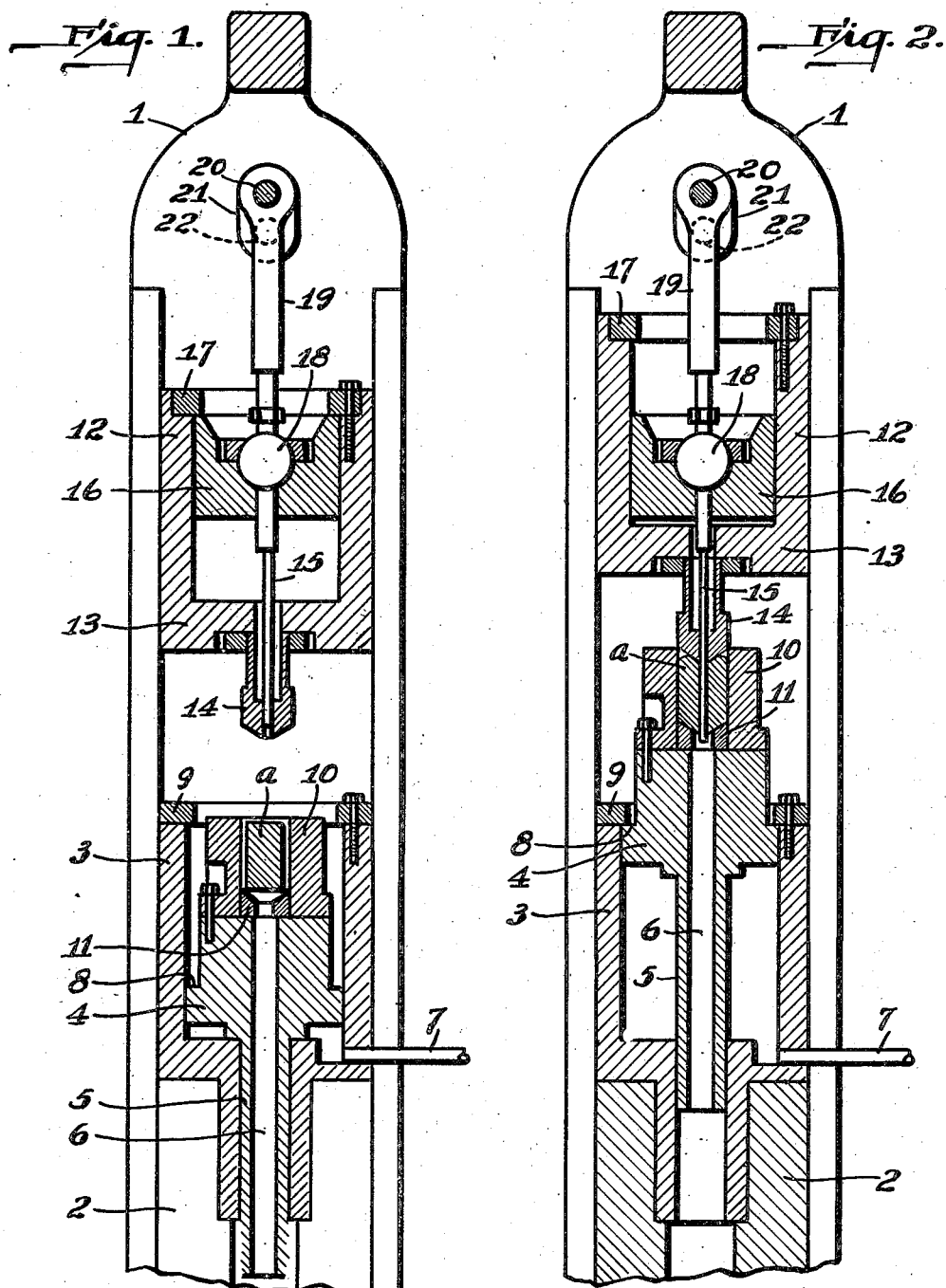

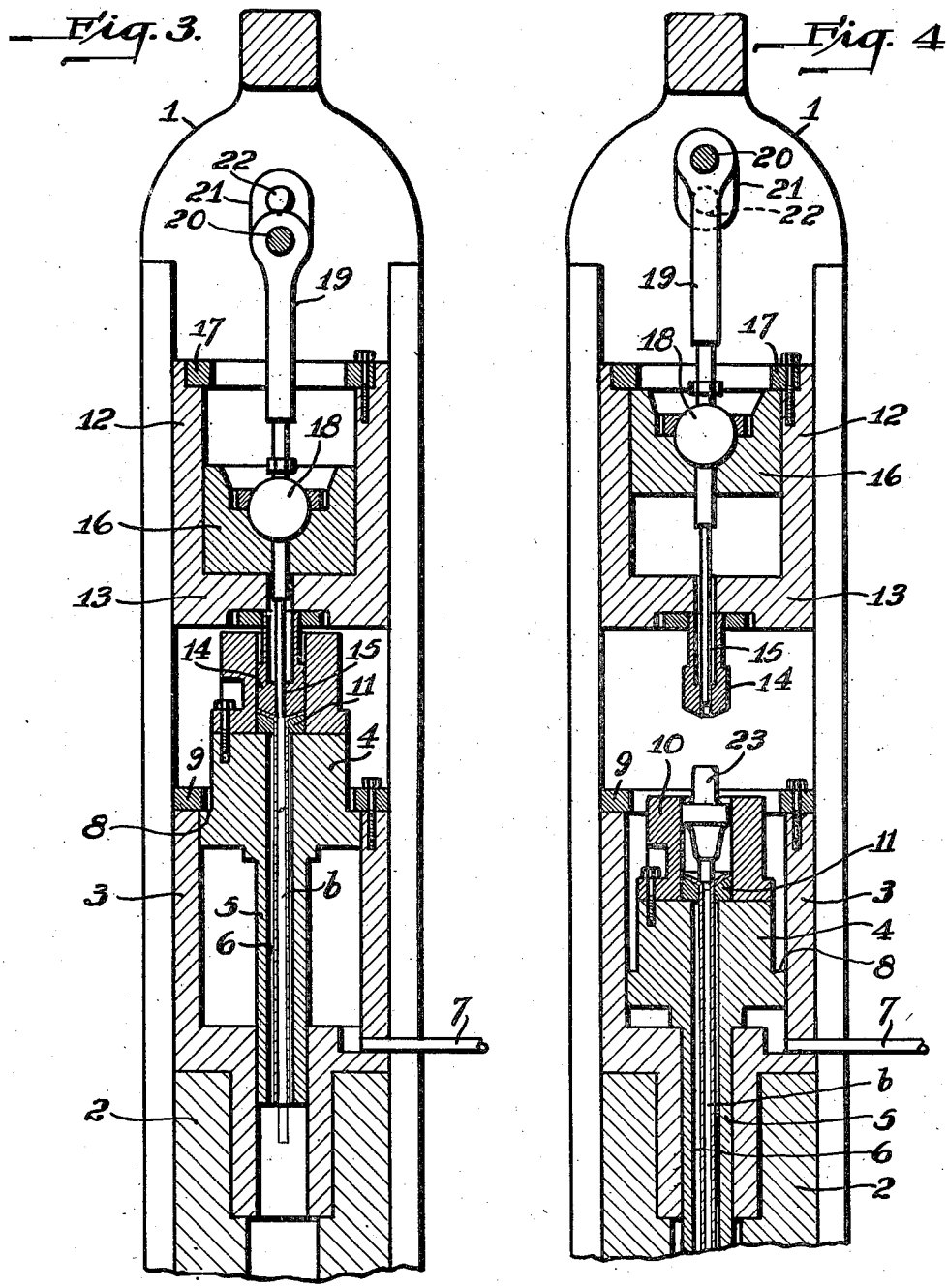

1,878,722

UNITED STATES PATENT OFFICE

FRITZ SINGER, OF NUREMBERG, GERMANY

METHOD OF EXTRUSION

Original application filed September 29, 1930, Serial No. 485,278, and in Germany April 2, 1928. Divided and this application filed August 29, 1931. Serial No. 560,124.

My invention pertains to an improved method of producing tubes, rods and other articles by the extrusion of a heated metal billet.

It has been found possible to carry on the hot extrusion process in connection with difficult metals, such as iron, steel and the like, by performing the extruding operation at a high speed such as is obtainable by the use of a mechanical press. It has further been found that a cycle of movement of a nature broadly like that which is obtained from a crank press is especially satisfactory,—one reason being that the plunger movement is relatively fast at one stage in the cycle, thereby giving a desirable extrusion speed, but decreases to zero, with a corresponding increase of power, during the last stage of the cycle. This increase of power towards the end of the cycle facilitates the extrusion of the last part of the billet down to a small residue, it being understood that the billet naturally cools during the extruding operation, so that the last part is the most difficult to extrude and requires the most power. However, in the hot extrusion process, as conducted prior to my present invention, the latter part only of the crank cycle has been employed, and in this way some of the desirable speed has been lost. It is an important object of my present invention to avoid this loss of speed.

In working upon the problem of extruding hot metals by a mechanical press employing a crank or kindred cycle, I ascertained that if it were attempted to use the whole cycle the initiation of the extruding operation, during the first movement of the plunger from zero towards a maximum, would be so slow as sometimes to cause the metal to freeze in the die. I found, however, that by employing a crank or kindred cycle of movement in which the plunger speed increased gradually from zero to a maximum and later decreased from the maximum to zero, and by initiating the extrusion operation somewhat later than the beginning of the cycle, I was able to start the extrusion of the metal properly, to increase the extrusion speed at the portions of the cycle where it was desirable that it should be increased, and to obtain improved results. This method of extrusion in which there is employed a cycle of movement in which the plunger speed increases gradually from zero to a maximum and later decreases again to zero, and in which the extruding of the metal is initiated during the first part of the cycle,—preferably shortly after the beginning of the cycle,—constitutes the subject of my present invention.

An apparatus by means of which my improved method can be practiced, is disclosed in my Patent No. 1,839,421, granted January 5, 1932, upon an application of which the present application is a division. Such apparatus is shown in the accompanying drawings, in which:

Fig. 1 is a sectional elevation of a crank actuated extrusion press, with the parts in the position they assume prior to the insertion of a billet into the container;

Fig. 2 is a similar view, showing the parts, however, in the position in which the billet container has been raised with respect to the punch, pushing the latter upward and causing the billet to be pierced by the mandrel;

Fig. 3 is a similar view, showing the parts after the punch has been forced downward to extrude the tube; and Fig. 4 is a view similar to Fig. 3 but showing the parts as having returned to their original position, ready for the severance of the billet residue from the extruded article.

The press shown in the drawings comprises a frame 1 which carries, at the lower part thereof, a fixed table 2. Upon such table is secured a vertically disposed hydraulic cylinder 3 in which operates a piston 4. The latter is formed with a stem 5 which is suitably guided in the cylinder and is formed with a central bore 6 to accommodate the extruded article,—in this case a tube. A pipe 7 provides for ingress of fluid under pressure to the interior of the cylinder, so that, when such fluid is admitted to the cylinder, the piston will be caused to rise in the latter until stopped by the engagement of a shoulder 8 with which it is provided by an abutment ring 9 secured to the top of the cylinder. Upon the top of the piston is secured the billet container 10, which carries, in the lower end thereof, the female die 11, the aperture of which makes alignment with the bore 6 of the piston.

Slidably mounted, in suitable ways, in the upper part of the press frame 1 is a punch carrier 12 which is made in the form of a hollow cylinder, having the lower end thereof closed by a wall 13. The punch carrier has extending downwardly therefrom, in alignment with the billet container 10, a punch 14, such punch being secured to the under side of the wall 13. The punch and the wall 13 are bored for the passage therethrough of the mandrel 15 which is secured to, and extends downward from, a mandrel carrier 16 which takes the form of a piston slidably mounted in the punch carrier. The relative movement between the punch carrier and mandrel carrier is limited, at the bottom, by the wall 13, and, at the top, by a ring 17 secured to the upper end of the punch carrier. The mandrel carrier is connected by means of a ball and socket joint 18 with one end of a connecting rod 19, the other end of which is mounted upon the pin 20 of a crank 21 secured upon a suitably driven crank shaft 22. In this way, rotative movement is imparted to the crank shaft and the mandrel carrier is first moved downward and then returned. During such time as the mandrel carrier is in engagement with either the wall 13 or the ring 17 of the punch carrier, the latter will participate in the movement of the mandrel carrier.

In the position of the parts shown in Fig. 1 a heated billet $a$ is inserted in the container 10 and fluid under pressure is then admitted to the interior of the cylinder 3. The result is that the piston 4 moves upwardly in the cylinder, carrying the billet into engagement with the lower end of the punch 14. The punch carrier will thereafter move upward with the billet, such upward movement being resisted only by the weight of the punch and its carrier. The mandrel carrier 16, however, is held stationary by the connecting rod 19, the crank shaft 20 not being in motion at the time, with the result that the billet, as it continues to move upward, is pierced by the mandrel 15. This piercing of the billet is completed by the time that the upward movement of the piston 4 is stopped by reason of the engagement of its shoulder 8 with the ring 9 (Fig. 2).

By the time the upward movement of the billet container 10 has been thus completed, the punch carrier will have been raised until its wall 13 is within a short distance of the bottom of the mandrel carrier 16. The crank shaft 20 is now set in motion, causing a downward movement of the mandrel carrier 16. The first part of this movement is ineffective, the mandrel carrier traversing the small space (Fig. 2) left between itself and the wall 13 of the punch carrier. When the mandrel carrier engages the wall 13, however, the punch carrier is caused to participate in its downward movement, whereby the punch is forced downward in the billet container so as to extrude the billet around the mandrel to produce the tube $b$, the extrusion being complete by the time that the crank 21 has reached its bottom dead center (Fig. 3). Thereafter the crank 21 completes its rotation and at the same time the pressure fluid is permitted to escape from the cylinder 3, so that the piston 4 descends of its own weight. This brings the parts to the position shown in Fig. 4. The billet residue is then sheared off from the tube by means of a suitable tool such as that indicated at 23, and such residue is removed from the container. Another billet can then be inserted and the process repeated.

It will be observed that all of the downward stroke of the crank 21 is employed for the extruding operation except the very first part of such stroke, such first part being occupied by the taking up of the space (Fig. 2) between the mandrel carrier and the wall 13 of the punch carrier. Thus the extruding movement of the punch carrier will be started at a material speed, and it is to be noted that this starting speed can be determined, in accordance with requirements, by varying the distance left between the mandrel carrier and the punch carrier when the billet container has reached its uppermost position.

I claim:

The method of extruding tubes from hot billets of metal which includes placing a hot billet in a container and imparting extruding pressure thereto by means of a reciprocating member to which is imparted a cycle of movement in the first part of which the speed increases gradually from zero to a maximum and in a second part of which the speed decreases gradually from the maximum to zero, and initiating the extrusion during the first part of said cycle and subsequent to the beginning thereof and concluding the extrusion during the second part of said cycle.

In testimony whereof, I hereunto sign my name.

FRITZ SINGER.